United States Patent
Gargi et al.

(10) Patent No.: US 7,747,625 B2
(45) Date of Patent: Jun. 29, 2010

(54) ORGANIZING A COLLECTION OF OBJECTS

(75) Inventors: Ullas Gargi, San Jose, CA (US); Daniel R. Tretter, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1678 days.

(21) Appl. No.: 10/631,369

(22) Filed: Jul. 31, 2003

(65) Prior Publication Data

US 2005/0027712 A1    Feb. 3, 2005

(51) Int. Cl.
 *G06F 17/00* (2006.01)
(52) U.S. Cl. .............. 707/737; 707/705; 707/736; 707/739; 707/740
(58) Field of Classification Search ............... 707/100, 707/103 R, 999.002, 999.003, 999.004, 999.007, 707/999.01
See application file for complete search history.

(56) References Cited

U.S. PATENT DOCUMENTS

| | | | |
|---|---|---|---|
| 6,351,556 B1 | 2/2002 | Loui et al. | |
| 6,810,146 B2 * | 10/2004 | Loui et al. ............ | 382/173 |
| 2002/0140746 A1 | 10/2002 | Gargi | |
| 2002/0168108 A1 | 11/2002 | Loui et al. | |
| 2002/0178276 A1 | 11/2002 | McCartney et al. | |
| 2003/0009469 A1 * | 1/2003 | Platt et al. ............ | 707/100 |
| 2003/0072486 A1 | 4/2003 | Loui et al. | |
| 2003/0110181 A1 * | 6/2003 | Schuetze et al. ....... | 707/103 R |

OTHER PUBLICATIONS

John C. Platt; Mary Czerwinski; Brent Field, "PhotoTOC: Automatic Clustering for Browsing Personal Photographs," MSR-TR-2002-17, Microsoft Corp (Feb. 2002).
Adrian Graham et al., "Time as Essence for Photo Browsing Through Personal Digital Libraries," JCDL (Jul. 2002).
Alexander C. Loui et al., "Automatic Image Event Segmentation and Quality Screening for Albuming Applications," IEEE International Conference on Multimedia and Expo., New York City, NY (Jul. 2000).
Alexander C. Loui et al., "A Software System for Automatic Albuming of Consumer Pictures," ACM, pp. 1-7 (1999).

\* cited by examiner

*Primary Examiner*—Hung Q Pham

(57) ABSTRACT

Systems and methods of organizing a collection of objects are described. In one aspect, a sequence of objects is segmented into object clusters based on: comparisons of successive object intervals to weighted measures of cluster extent; and comparisons of successive object intervals to weighted measures of cluster object density. In another aspect, objects from the collection are segmented into clusters. Context-related meta data associated with the objects and parsable into multiple levels of a name hierarchy is extracted. Names are assigned to clusters based on the extracted context-related meta data corresponding to a level of the name hierarchy selected to distinguish segmented clusters from one another. In another aspect, a sequence of objects that are segmented into clusters is accessed. Each cluster includes multiple objects arranged in a respective sequence in accordance with context-related meta data associated with the objects. At least two constituent objects representative of beginning and ending instances in the corresponding object sequence are selected for each object cluster. The selected representative objects of each cluster are graphically presented on a screen.

48 Claims, 10 Drawing Sheets

ORGANIZING A COLLECTION OF OBJECTS

TECHNICAL FIELD

This invention relates to systems and methods of organizing a collection of objects.

BACKGROUND

Individuals and organizations are rapidly accumulating large collections of digital content, including text, audio, graphics, animated graphics, full-motion video, and other digital content, including business process execution data and monitoring data. This content may be presented individually or combined in a wide variety of different forms, including documents, e-mail messages, alerts, presentations, music, still photographs, commercial videos, home movies, and meta data describing one or more associated digital content files. As these collections grow in number and diversity, individuals and organizations increasingly will require systems and methods for organizing and browsing the digital content in their collections. To meet this need, a variety of different systems and methods for organizing and browsing different kinds of digital content have been proposed. Media object management and business process object management are examples of fields for which digital content organizing and browsing schemes have been developed.

Media Object Management

Many systems allow a user to manually classify images and other digital content by their association with a particular event or subject matter and to segment this digital content based on these classifications. Manual classification systems, however, tend to be time consuming and unwieldy, especially as the size of the digital content collection grows. Some systems are configured to automatically segment digital content, such as images, based on color, shape, or texture features. These automatic segmentation systems, however, often tend to misclassify the digital content because of the inherent inaccuracies associated with classification based on color, shape, or texture features.

A system for automatic albuming of consumer pictures has been proposed that automatically determines the order in which pictures should be presented and provides an initial basis for automating the selection of images to be included in a given album. The system includes modules for image event clustering, dud detection, and duplicate detection. The image event clustering module automatically segments a set of pictures into events and sub-events for layout onto an album page based on date and time information recorded at generation time, as well as image content information. The dud detection module detects very low quality pictures and allows a user to exclude such pictures from the album. The duplicate detection module detects potential duplicate pictures and allows a user to choose a particular one of the detected duplicates for inclusion in the album.

Another digital photograph browsing system applies time-based and content-based clustering algorithms to a collection of digital photographs to identify events in the collection. The time-based clustering algorithm compares a gap in the creation times of the photographs to a local average of temporally nearby gaps. A gap is considered to correspond to a change of event when it is much longer than the local gap average. In order to handle the wide dynamic range of time gaps, the gap detection algorithm operates on logarithmically transformed time gaps. The content-based clustering algorithm is based on probabilistic color histogram models of the digital photographs.

Business Process Object Management

E-business is transforming corporations, markets, and the global economy. The conduct of business over internet (e.g., buying, selling, servicing customers and collaborating with business partners) is affecting how business transactions are performed. Today, web interfaces allow customers to easily find products, services, providers and suppliers that they need, compare prices and qualities, and trade, buy, and get products and services delivered quickly. Customers may be presented with user-friendly graphical interfaces, targeted advertisements, up-to-date product catalogues, and personalized stores. The web facade, however, hides inefficiencies, manual and error-prone operations, and slow, complex, inflexible, and unmanageable systems. Indeed, in many e-business applications, the execution of business processes involves a substantial amount of human intervention in several aspects of business process execution, such as (repeated) data entry, process execution monitoring (a process that often requires tracking each process over several systems in order to find out its current advancement state), exception handling, and scheduling of process activities.

As a result, process design, automation, and management technologies are being used in both traditional and newly-formed, internet-based enterprises in order to improve the quality and efficiency of their administrative and production processes, to manage electronic commerce (or e-commerce) transactions, and to rapidly and reliably deliver services to businesses and individual customers. To this end, various data mining and other data management approaches are being developed to organize and browse the large collections of business process data that is being generated at an ever-increasing rate.

SUMMARY

The invention features systems and methods of organizing a collection of objects.

In one aspect of the invention, a sequence of objects is segmented into is object clusters based on: comparisons of successive object intervals to weighted measures of cluster extent; and comparisons of successive object intervals to weighted measures of cluster object density.

In another aspect of the invention, objects from the collection are segmented into clusters. Context-related meta data associated with the objects and parsable into multiple levels of a name hierarchy is extracted. Names are assigned to clusters based on the extracted context-related meta data corresponding to a level of the name hierarchy selected to distinguish segmented clusters from one another.

In another aspect of the invention, a sequence of objects that are segmented into clusters is accessed. Each cluster includes multiple objects arranged in a respective sequence in accordance with context-related meta data associated with the objects. At least two constituent objects representative of beginning and ending instances in the corresponding object sequence are selected for each object cluster. The selected representative objects of each cluster are graphically presented on a screen.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. System Overview

The object manager embodiments described in detail below are configured to automatically organize a collection of objects into meaningful clusters (or groups) that may be used for any of a variety of applications, including permanent organization, collective annotation, and dynamic visualization. The objects are segmented based on criteria structured to model the ways in which objects typically are created so that each of the resulting clusters more accurately contains all of the objects relating to a common context (e.g., the same event, location, or subject matter). In this way, the object manager embodiments provide an efficient and accurate process for automatically segmenting a collection of objects. In addition, some object manager embodiments provide a user with an intuitive and natural user interface for browsing and customizing the automatically segmented object clusters. Some object manager embodiments also provide an automatic process for storing and assigning meaningful, context-sensitive names to the object clusters and the objects within the clusters.

The object management embodiments are presented below in connection with the exemplary application environments of managing media objects and managing business process objects. In general, however, these object management embodiments may be configured to manage homogeneous and heterogeneous collections containing any type of objects that are associated with context-related meta data (e.g., meta data relating to the creation, termination, extent, operating environment, and other direct or circumstantial information), including one or both of time meta data and location (geographic or logical) meta data.

II. Object Manager Architecture

Figure 1:
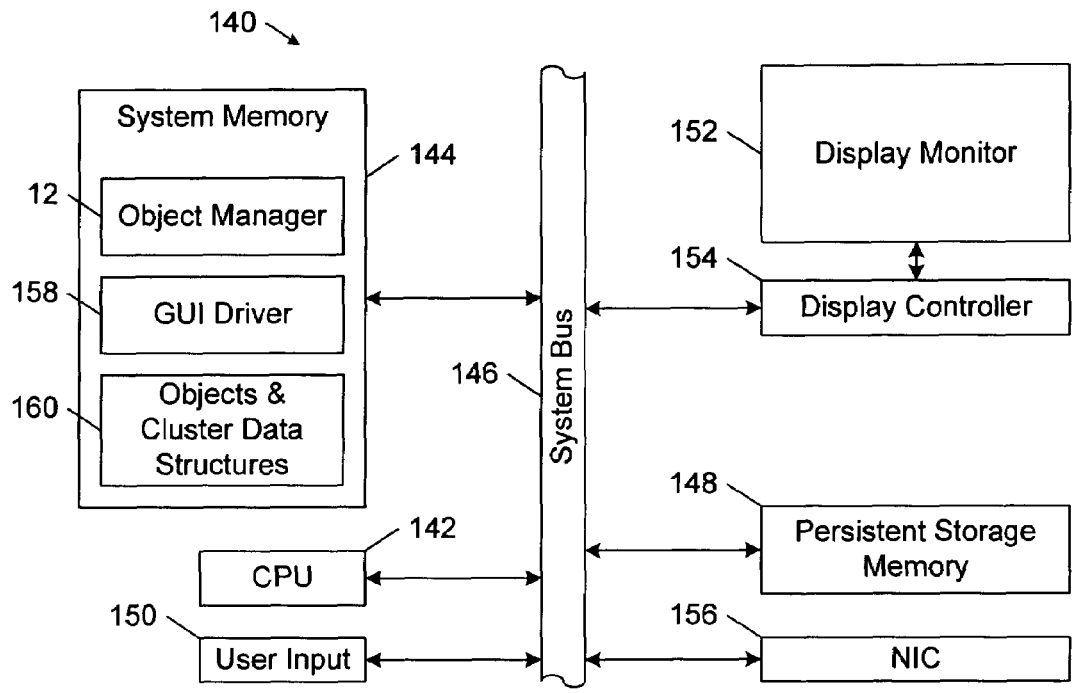
FIG. 1 is a diagrammatic view of a computer system that is programmable to implement an embodiment of a method of organizing objects.

Referring to FIG. 1, in one embodiment, an object manager 12 may be implemented as one or more respective software modules operating on a computer 140. Computer 140 includes a processing unit 142, a system memory 144, and a system bus 146 that couples processing unit 142 to the various components of computer 140. Processing unit 142 may include one or more processors, each of which may be in the form of any one of various commercially available processors. System memory 144 may include a read only memory (ROM) that stores a basic input/output system (BIOS) that contains start-up routines for computer 140 and a random access memory (RAM). System bus 146 may be a memory bus, a peripheral bus or a local bus, and may be compatible with any of a variety of bus protocols, including PCI, VESA, Microchannel, ISA, and EISA. Computer 140 also includes a persistent storage memory 148 (e.g., a hard drive, a floppy drive, a CD ROM drive, magnetic tape drives, flash memory devices, and digital video disks) that is connected to system bus 146 and contains one or more computer-readable media disks that provide non-volatile or persistent storage for data, data structures and computer-executable instructions. A user may interact (e.g., enter commands or data) with computer 140 using one or more input devices 150 (e.g., a keyboard, a computer mouse, a microphone, joystick, and touch pad). Information may be presented through a graphical user interface (GUI) that is displayed to the user on a display monitor 152, which is controlled by a display controller 154. Computer 140 also may include peripheral output devices, such as speakers and a printer. One or more remote computers may be connected to computer 140 through a network interface card (NIC) 156.

As shown in FIG. 1, system memory 144 also stores object manager 12, a GUI driver 158, and a database 160 containing multiple objects and cluster data structures. Object manager 12 interfaces with the GUI driver 158 and the user input 150 to control the creation of the cluster data structures. Object manager 12 also interfaces with the GUI driver 158 and the objects and cluster data structures to control the object browsing experience presented to the user on display monitor 152. The objects in the collection that are to be organized and browsed may be stored locally in persistent storage memory 148 or stored remotely and accessed through NIC 156, or both.

Figure 2:
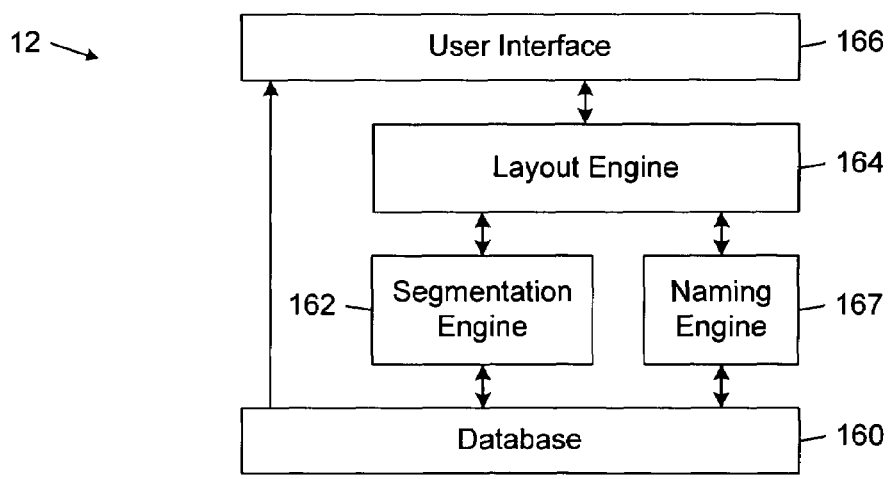
FIG. 2 is a block diagram of an embodiment of an architecture of a object manager for organizing a collection of objects.

FIG. 2 shows an implementation of a object manager architecture that includes a segmentation engine 162, a layout engine 164, a user interface 166, and a naming engine 167. Segmentation engine 162 accesses objects from a collection of objects stored in database 160. In some implementations, segmentation engine 162 arranges the objects into a sequence in accordance with context-related meta data associated with the objects. For example, segmentation engine 162 may arrange the objects in a chronological sequence based on meta data relating to times when the objects were generated. Segmentation engine 162 also may arrange the objects in a geographical sequence based on meta data relating to graphical or logical locations where the objects were generated. As explained in section III below, segmentation engine 162 segments the sequence of objects into object clusters. The segmentation information may be stored in one or more data structures in, for example an XML (extensible Markup Language) format. Layout engine 164 selects for each object cluster at least two constituent objects representative of beginning and ending contexts in the corresponding object sequence. Layout engine cooperates with user interface 164 to graphically present the selected representative objects of each cluster on a screen and allow a user to browse the segmented object collection. A user may edit the clusters that were generated automatically by segmentation engine 162 by issuing commands through user interface 166. As described in detail below in section IV, in some embodiments, naming engine 167 is configured to execute an automated process for assigning meaningful, context-sensitive names to the segmented object clusters and to objects within the clusters.

III. Segmenting Objects

Referring to FIGS. 3, 4A, 4B, and 5, in some embodiments, segmentation engine 162 is operable to segment a sequence of objects associated with context-related meta data as follows. In these embodiments, segmentation engine 162 heuristically splits the sequence of objects into clusters that correspond to contexts based on the following empirically observed properties of such object sequences: (i) a large interval with no object generation usually marks the end of a context (e.g., an event); and (ii) a sharp increase in the frequency of object generation usually marks the start of a new context. The scale for distinguishing a "large" interval from other intervals is determined based on whether the interval is large relative to the extent of the current cluster and whether the interval is large relative to the average inter-generation interval of the current cluster.

Before being segmented, the objects are arranged into a sequence that is ordered in accordance with context-related meta data associated with the objects (step 168). The objects may be arranged into the sequence by segmentation engine 162 or they may pre-ordered into the sequence before being processed by segmentation engine 162.

In some implementations, the objects in a sequence 170 (FIG. 4A) may be arranged in accordance with the times ($t_0, t_1, \ldots, t_8$) when the objects were generated. The generation time meta data (e.g., time stamps) may be recorded by the devices (e.g., a digital camera, digital camcorder, cellular telephone, or business process platform component, such as a network or business process node device) that generate the objects. Alternatively, the generation time meta data may be associated with the objects by a manual or automatic post-generation process. The generation timestamps may be stored in any suitable meta data format (e.g., the EXIF (Exchangeable Image File) meta data format).

In other implementations, the objects in a sequence 172 (FIG. 4B) are arranged in accordance with the locations ($L_0, L_1, \ldots, L_8$) where the objects are generated. The locations may correspond to geographic (or spatial) locations or to logical locations (e.g., logical node locations in a business process or a computer network). The generation location meta data (e.g., location stamps) may be obtained from a location tracking device (e.g., a Global Positioning System (GPS) device or a cellular tower triangulation device) that is incorporated within a device used to generate a media object or, for example, from a network packet header containing an identifier of a network or business process node that generated a business process object. Alternatively, the generation location meta data may be associated with the objects by a manual or automatic post-generation process. The generation location stamps may be stored in any suitable meta data format, such as the EXIF format.

Referring back to FIG. 3, segmentation engine 162 automatically segments the ordered sequence of objects as follows. Segmentation engine 162 initiates a new cluster by selecting a object at one end (either the beginning or the end) of the sequence (step 174). Segmentation engine 162 selects the next object in the sequence as a candidate for merging into the current cluster (step 176). If the interval between the candidate object and the last object merged into the current cluster is greater than or equal to a weighted measure of the extent of the current cluster (step 178), a new cluster is initiated (step 174).

The interval between successive objects corresponds to the distance separating the objects measured in the dimension of the context-related meta data in accordance with which the object sequence is arranged. For example, if the objects are arranged in accordance with generation time meta data, the interval between successive objects corresponds to the duration separating the generation times of the objects. If the objects are arranged in accordance with generation location meta data, the interval between successive objects corresponds to the geographic distance separating the locations where the objects were generated or the logical distance separating the objects, depending on the nature of the objects in the collection. The extent of a cluster corresponds to the distance spanned by the objects contained within the cluster measured in the dimension (e.g., time or space) of the context-related meta data in accordance with which the object sequence is arranged.

Figure 4A:
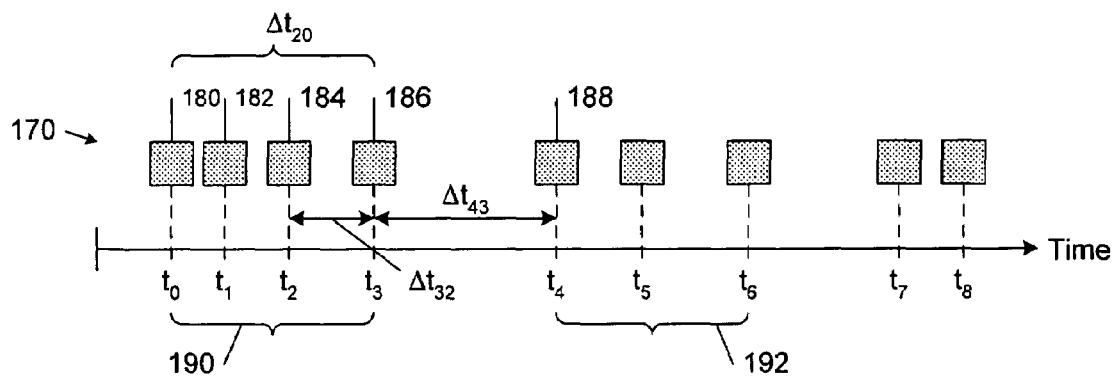
FIG. 4A is a diagrammatic view of a sequence of objects arranged in accordance with the times when the objects were generated.

Referring to FIG. 4A, in one exemplary illustration, assuming the current cluster consists of objects 180, 182, 184, the test of step 178 compares the interval between the next candidate object 186 in sequence 170 (i.e., the interval $\Delta t_{32}=t_3-t_2$) with a weighted measure of the extent of the current cluster (i.e., the extent $\Delta t_{20}=t_2-t_0$). If $\Delta t_{32} \geq F \cdot \Delta t_{20}$ (step 178), where F is the weighting factor, object 186 is not merged into the current cluster. The weighting factor F that is applied to the cluster extent may be determined empirically. In some implementations, the weighting factor decreases with increasing cluster size. The weighting factor may decrease linearly, exponentially, or in accordance with any suitable decay function, rule, or lookup table. Assuming the test of step 178 is not satisfied, object 186 is merged into the current cluster and the next candidate object 188 is considered for merger into the current cluster (steps 176, 178). If the generation time interval between objects 188 and 186 (i.e., $\Delta t_{43}=t_4-t_3$) is greater than the weighted measure of the extent of the current cluster 190

(i.e., extent $\Delta t_{30}=t_3-t_0$) (step 178), then a new cluster 192 is initiated beginning with object 188 (step 174). In some embodiments, a new cluster is not initiated unless the current cluster has more than a prescribed minimal number of objects.

Figure 4B:
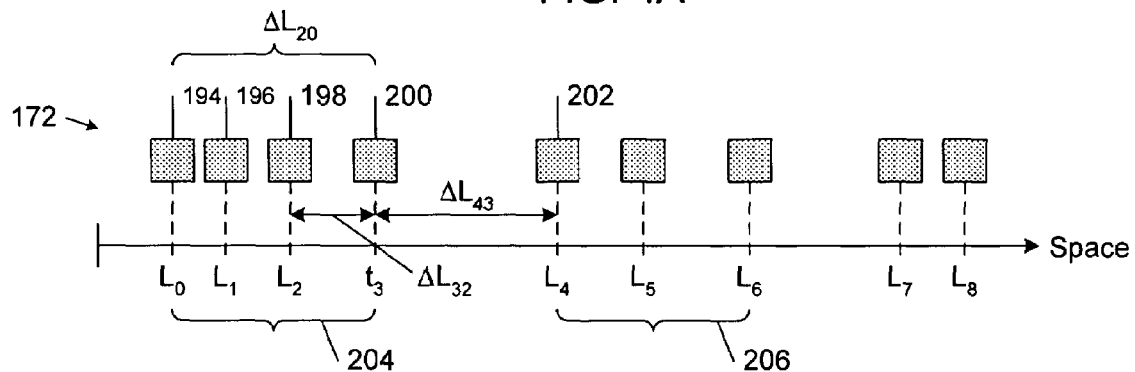
FIG. 4B is a diagrammatic view of a sequence of objects arranged in accordance with the locations were the objects were generated.

Similarly, referring to FIG. 4B, in another exemplary illustration, assuming the current cluster consists of objects 194, 196, 198, the test of step 178 compares the interval between the next candidate object 200 in sequence 172 (i.e., the interval $\Delta L_{32}=L_3-L_2$) with a weighted measure of the extent of the current cluster (i.e., the extent $\Delta L_{20}=L_2-L_0$). If $\Delta L_{32} \geq F \cdot \Delta L_{20}$ (step 178), where F is the weighting factor, object 200 is not merged into the current cluster. The weighting factor F that is applied to the cluster extent may be determined empirically. In some implementations, the weighting factor decreases with increasing cluster size. The weighting factor may decrease linearly, exponentially, or in accordance with any suitable decay function, rule, or lookup table. Assuming the test of step 178 is not satisfied, object 200 is merged into the current cluster and the next candidate object 202 is considered for merger into the current cluster (steps 176, 178). If the generation location interval between objects 202 and 200 (i.e., $\Delta L_{43}=L_4-L_3$) is greater than the weighted measure of the extent of the current cluster 204 (i.e., extent $\Delta L_{30}=L_3-L_0$) (step 178), then a new cluster 206 is initiated beginning at object 202 (step 174). In some embodiments, a new cluster is not initiated unless the current cluster has more than a prescribed minimal number of objects. If the interval between the candidate object and the last object that was merged into the current cluster is less than the weighted measure of the extent of the current cluster (step 178), segmentation engine 162 compares the interval to a weighted measure of the density of objects in the current cluster (step 208). The object density of a cluster corresponds to a measure of the distribution of object intervals in the cluster. In some implementations the object density corresponds to an average measure (e.g., a first order statistic, such as the arithmetic mean, the median, the mode, or the like, which describes or summarizes the distribution of successive object intervals in the cluster) of the intervals separating objects in the cluster. The average may be a global average computed for all of the objects in the cluster or it may be a local moving average computed over a moving window encompassing a subset of objects in the current cluster sequence closest to the candidate object.

Figure 5:
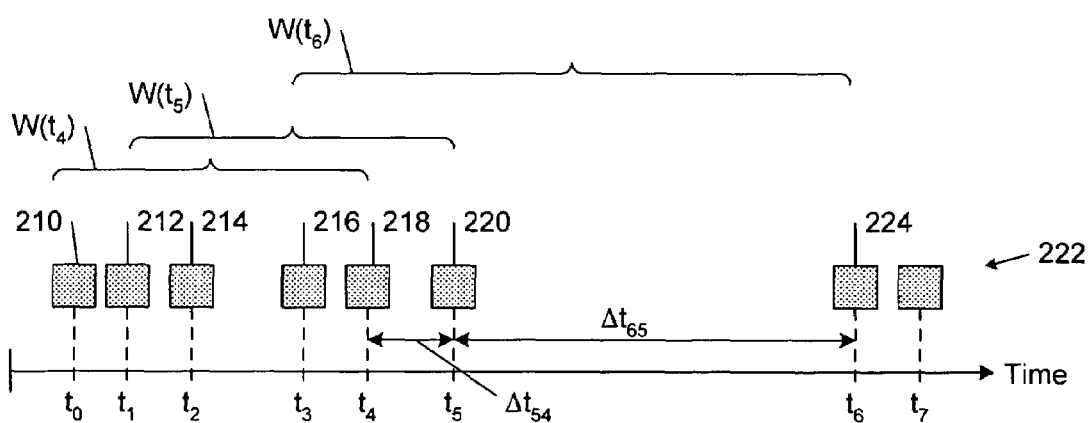
FIG. 5 is a diagrammatic view of a sequence of objects and a set of moving windows used to compute moving averages of intervals between successive objects.

Referring to FIG. 5 in one exemplary illustration, assuming the current cluster consists of objects 210, 212, 214, 216, 218, the test of step 208 compares the interval between the next candidate object 220 in a sequence 222 (i.e., the interval $\Delta t_{54}=t_5-t_4$) with a weighted measure of the object density of the current cluster. In the illustrated implementation, the object density of the current cluster is computed as the average interval between successive objects in a moving window $W(t_i)$, where $i=0, 1, \ldots, N-1$, and N is the number of objects in sequence 222. In the case of the candidate object 220, the test of step 208 is expressed by:

$$\Delta t_{54} \geq \frac{G}{k-1} \cdot \left( \sum_{i=0}^{k-2} (t_{i+1} - t_i) \right)$$

where k is the number of objects in the window $W(t_{k-1})$ (i.e., k=5 in the illustrated example) and G is the weighting factor. The weighting factor G that is applied to the object density of the current cluster may be determined empirically. In some implementations, the weighting factor decreases with increasing cluster size. The weighting factor may decrease linearly, exponentially, or in accordance with any suitable decay function, rule, or lookup table. Assuming the test of step 208 is not satisfied, object 220 is merged into the current cluster and the next candidate object 224 is considered for merger into the current cluster (steps 176, 178, 208). For illustrative purposes, assume that the test of step 178 is satisfied, but the generation time interval between objects 224 and 220 (i.e., $\Delta t_{65}=t_6-t_5$) is greater than the weighted measure of the object density of the current cluster 204 (step 208). That is, $$\Delta t_{65} \geq \frac{G}{k-1} \cdot \left( \sum_{i=1}^{k-1} (t_{i+1} - t_i) \right)$$

Then a new cluster is initiated (step 174).

The test of step 208 may be computed analogously for object sequences arranged in accordance with location-based generation meta data.

If the interval between the candidate object and the last object merged into the current cluster is less than the weighted measure of the object density of the current cluster (step 208), segmentation engine 162 compares the object density of a candidate cluster, consisting of the current cluster and the candidate object, with a weighted measure of the object density of the current cluster. For example, in the case of candidate object 224 (FIG. 5), segmentation engine 162 compares the object density computed over window $W(t_6)$ with a weighted measure of the object density computed over window $W(t_5)$. If DENSITY($W(t_{CANDIDATE})$)<
 $H$·DENSITY($W(t_{CANDIDATE-1})$)

(step 225), a new cluster is initiated (step 174). Here, the function DENSITY($W(t_j)$) computes the object density over a window ending at the object generated at time $t_j$, $t_{CANDIDATE}$ corresponds to the generation time of candidate object, and H is the weighting factor. The weighting factor H may be determined empirically. In some implementations, the weighting factor decreases with increasing cluster size. The weight factor may decrease, linearly, exponentially, or in accordance with any suitable decay function, rule, or lookup table.

The test of step 225 may be computed analogously for object sequences arranged in accordance with location-based generation meta data.

If the candidate object satisfies all of the criteria specified in steps 178, 208, and 225, the candidate object is merged into the current cluster (step 226) and the next candidate object in the sequence is selected for potential merger into the current object cluster (step 176).

Figure 3:
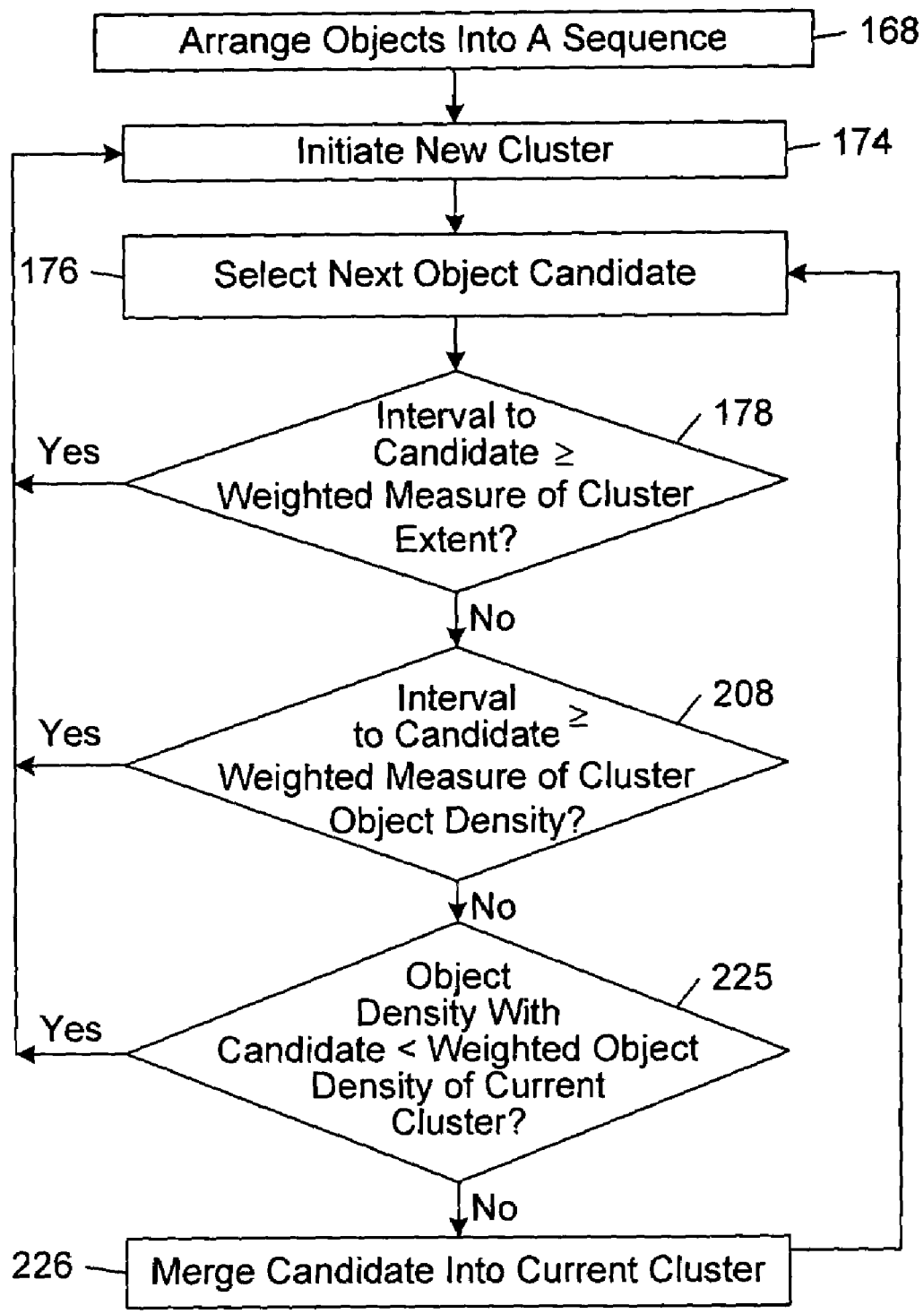
FIG. 3 is a flow diagram of an embodiment of a method of segmenting a sequence of objects.

In some embodiments, after the object sequence has been processed from one end, the object method of FIG. 3 is repeated beginning at the other end of the object sequence. The segmentation clusters produced by processing the object sequence in both directions are merged to produce a final set of object clusters.

The above-described algorithm for segmenting a sequence of objects is summarized by the following sequence of pseudo code steps. In these steps, $|C_k|$ is the extent (i.e., range, maximum—minimum) of cluster $C_k$, and $|C_k|_\#$ is the cardinality of cluster $C_k$.

1. Given the generation-context sequence x(i), i = 0, 1, ..., N-1, sort it ascending.
2. The first cluster $C_0$ is begun with x(0). Examine the next item x(1).
3. At any time, if item x(i) is being examined for candidate inclusion in the current cluster $C_k$, mark x(i) as a split point (i.e., as being the start of a new cluster $C_{k+1}$) if
    a. $C_k$ has a certain minimum number of items $|C_k|_{\# MIN}$
    b. $C_k$ has a certain minimum extent $|C_k|_{MIN}$
    c. $x(i) - x(i-1) > F \cdot (|C_k|_\#) \cdot |C_k|$ OR
    d. $x(i) - x(i-1) > G \cdot (|C_k|_\#) \cdot recentaverage_w(i)$
4. ELSE IF $recentaverage_w(i) < H \cdot recentaverage_w(i-w)$ mark a split
5. ELSE, add x(i) to $C_k$, update extent($C_k$), $recentaverage_w(C_k)$, F, G, and H, and continue with x(i + 1)
6. Once x(N - 1) has been processed, reverse the sequence and repeat steps 2-5
7. Merge the two sets of clusters from the forward and backward phases In the above pseudo code, $recentaverage_w(j)$ returns the average intergeneration interval for the current cluster over a local window W in the past ending at object j. The functions F, G, and H are empirically determined and gradually decrease as the cardinality of $C_K$ increases. Thus, as a cluster grows, the relative gap needed to start a new event decreases. The initial values of these functions, as well as the values of $|C_k|_{MIN}$ and $|C_k|_{\# MIN}$ are determined by a user-settable parameter that controls the level of segmentation. In one implementation, three empirically-determined default levels of segmentation are provided for object collections of different sizes: large (e.g., collections with objects generated over many years), medium (e.g., collections with objects generated over a year or so), and small (e.g., collections with objects generated over few days).

Customized Object Segmentation

In the above-described embodiments, it was noted that each of the weighting factors F, G, and H may decrease with increasing cluster size either linearly, exponentially, or in accordance with any suitable decay function, rule, or lookup table. In some embodiments, one or more of the weighting factors F, G, and H may be customized for a particular object generation environment based on an analysis of a collection of media objects captured in that environment.

For example, it has been observed that the estimated fractal dimension of a person's media object capture behavior is relatively constant over different collections. Accordingly, in some implementations, the fractal dimension of a user's media object capture behavior is estimated (e.g., using a conventional box-counting algorithm, as described in Jurgens, Peitgen and Saupe, "Chaos and Fractals: New Frontiers of Science, Springer-Verlag, 1992, which is incorporated herein by reference) from a collection of media objects captured by the user. The estimated fractal dimension then is used to scale one or more default ranges for one or more of the weighting factors F, G, and H, respectively. In this way, the above-described object segmentation embodiments may be specifically tailored to a particular user so that each of the clusters produced by the above-described object segmentation embodiments more accurately captures all of the objects relating to a common context.

Objects generated by a business process platform for a particular business organization also may be modeled. The modeling information may be used in a similar way to customize the initial values of one or more of the weighting factors F, G, and H to the particular business platform and business organization environment.

IV. Automatically Naming and Storing Objects and Object Clusters

A. Naming Ojects and Object Clusters

As mentioned above, some object manager embodiments implement an automatic process for assigning meaningful, context-sensitive names to the object clusters and the objects within the clusters.

Figure 6:
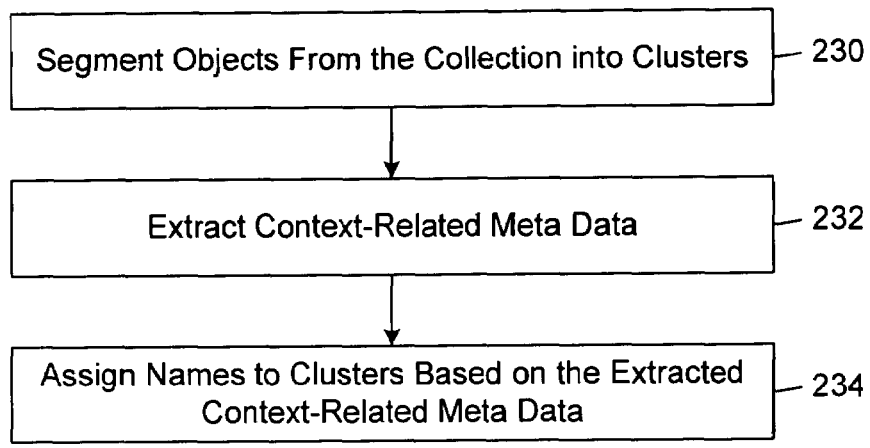
FIG. 6 is a flow diagram of an embodiment of a method of organizing a collection of objects by segmenting objects from the collection into clusters and assigning names to each cluster.

FIG. 6 shows an embodiment of a method of organizing a collection of objects. Objects from the collection are segmented (step 230). The objects may be segmented in accordance with any object segmentation method, including one of the object segmentation methods described above. Layout engine 164 extracts context-related meta data that is associated with the objects and is parsable into multiple levels of a name hierarchy (step 232).

Figure 7A:
FIG. 7A is a diagrammatic view of a generation-time-based name hierarchy.

Referring to FIG. 7A, in some implementations, the context-related meta data may correspond to information relating to the times when the objects were generated. Such information may include, for example, the year, day, hour, and minute when a object is generated. The generation time meta data is parsable into multiple levels from a high level (YEAR) to a low level (MINUTE). The generation time meta data may be recorded by the devices (e.g., a digital camera, digital camcorder, cellular telephone, or business platform component, such as a network or business process node device) that generates the objects. Alternatively, the generation time meta data may be associated with the objects by a manual or automatic post-generation process. The generation timestamps may be stored in any suitable meta data format (e.g., the EXIF meta data format).

Figure 7B:
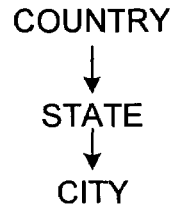
FIG. 7B is a diagrammatic view of a generation-location-based name hierarchy.

Referring to FIG. 7B, in some implementations, the context-related meta data may correspond to information relating to the locations where the objects were generated. In some implementations, such information may include, for example, the country, state, and city where a object is generated. In other implementations, the generation location meta data may correspond to information (e.g., zip code information) from which the generation location may be derived. The generation location meta data is parsable into multiple levels from a high level (COUNTRY) to a low level (CITY). The generation location meta data may be obtained from a location tracking device (e.g., a Global Positioning System (GPS) device or a cellular tower triangulation device) that is incorporated within a device used to generate a media object or, for example, from a network packet header containing an identifier of a network or business process node that generated a business process object. Alternatively, the generation location meta data may be associated with the objects by a manual or automatic post-generation process. The generation location stamps may be stored in any suitable meta data format, such as the EXIF format.

Referring back to FIG. 6, after the context-related meta data has been extracted (step 232), names are assigned to clusters based on the extracted context-related meta data corresponding to a level of the name hierarchy selected to distinguish segmented clusters from one another (step 234). In one implementation, names are assigned to clusters based on extracted context-related meta data corresponding to the highest levels of the name hierarchy that distinguish clusters from each other. The resulting clusters are referred to herein as being "minimally-labeled".

Given a generation-context object sequence and a clustering, each cluster may be automatically minimally-labeled based on its extent relative to its neighbors. For example, a cluster with photographs in the range [11 Jun. 2002, 18 Jun. 2002] with neighbors taken solely in May and July of 2002, could be labeled "June 2002". This is the minimal-labeling (i.e., the most general label in the name hierarchy that distinguishes the cluster from other clusters in the segmented sequence). The same cluster with neighbors in the ranges [2 Jun. 2002, 5 Jun. 2002] and [25 Jun. 2002, 30 Jun. 2002] could be labeled "Jun. 11-18, 2002". The same cluster with neighbors having photographs taken solely in 2001 and 2003 could be labeled "2002". If new photographs are added to the collection after the clusters are labeled, the clusters in the collection could be readily re-named appropriately.

Pseudo code for an implementation of a method of automatically labeling clusters based on generation time meta data follows. The labels assigned to a given cluster corresponds to the largest time units (i.e., highest in the name hierarchy) associated with the objects at the ends of the given cluster that distinguish the time units associated with the objects at the ends of neighboring clusters.

1. For each cluster generate a label $L_p$-$L_s$, denoting the extent of the cluster where $L_p$ is the prefix (starting point) and $L_s$ is the suffix (ending point).
2. Compute the smallest standard unit U enclosing the cluster (e.g., day month, season, or year; street, zip code, city, country, metropolitan area, state, or country).
3. For the particular case of a one-dimensional object sequence (e.g., a object sequence arranged in accordance with generation time meta data), let the cluster have left and right ends $C_l$ and $C_r$. Let the cluster's left neighbor have a right end L and its right neighbor have a left end R. Let $U_t$ be the largest standard unit possible (e.g., year).
4. Quantize $C_l$ and L by $U_t$.
5. If quantized $C_l$ and L values are different, return $U_t$.
6. Else, decrement $U_t$ and repeat.
7. If $U_t$ reaches the smallest standard unit, return it.
8. Repeat steps 4-7 for $C_r$ and R to get $U_r$.
9. The labeling level U = min $\{U_l, U_r\}$.
10. Label prefix $L_p = C_l$ quantized at the U level. Label suffix $L_s = C_r$ quantized at the U level. Optionally, $L_p$ and $L_s$ may be quantized at different levels.
11. If $L_p$ and $L_s$ are identical, collapse $L_p$ and $L_s$ into one label.

The above-described method may be applied to assign names to object clusters segmented from a sequence of objects associated with any type of meta data that has multiple hierarchical levels or resolutions of representation. For example, this method may be used to label clusters based on generation time meta data, generation location meta data, or any other hierarchical meta data associated with the objects. This method also may be extended to cover labeling in multiple dimensions (e.g., time and space).

The objects in any given cluster may be named automatically based on the name assigned to the given cluster. The objects in the given cluster may be named automatically in accordance with a chronological ordering of the objects in the given cluster. For example, the objects may be assigned names with a common prefix corresponding to the name assigned to the cluster and with a suffix corresponding to cardinal numbers assigned in accordance with a chronological ordering of the objects in the cluster.

B. Storing Objects and Object Clusters

Figure 8:
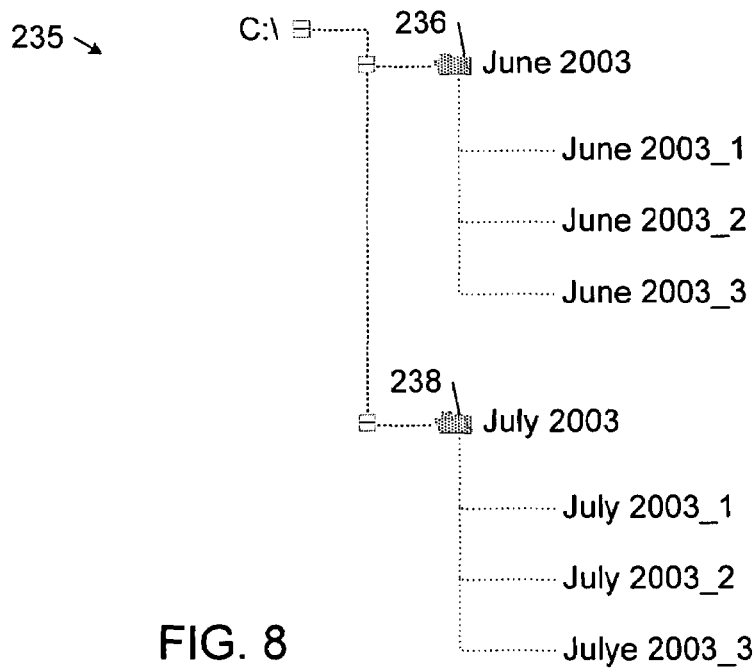
FIG. 8 is a diagrammatic view of a folder-based tree structure created in accordance with an embodiment of a method of storing objects.

FIG. 8 shows an exemplary embodiment in which objects in a collection are stored in a folder-based tree structure 235 organized by cluster and labeled in accordance with the above-described automatic naming embodiment. In this embodiment, each cluster is stored in a respective folder 236, 238 that is minimally-labeled, as described above. Each of the folders 236, 238 contains a respective set of objects that were segmented into the clusters in accordance with one of the above-described object segmentation methods. The media objects are named automatically in accordance with a chronological ordering of the objects in each cluster. The folder-based tree structure 235 provides an intuitive and logical object organization and storage scheme that enables a user to readily locate objects in accordance with the context-sensitive segmentation approach described above.

V. User Interface for Browsing and Customizing Object Clusters

As mentioned above, some object manager embodiments provide a user with an intuitive and natural user interface for browsing and customizing the segmented object clusters.

Figure 9:
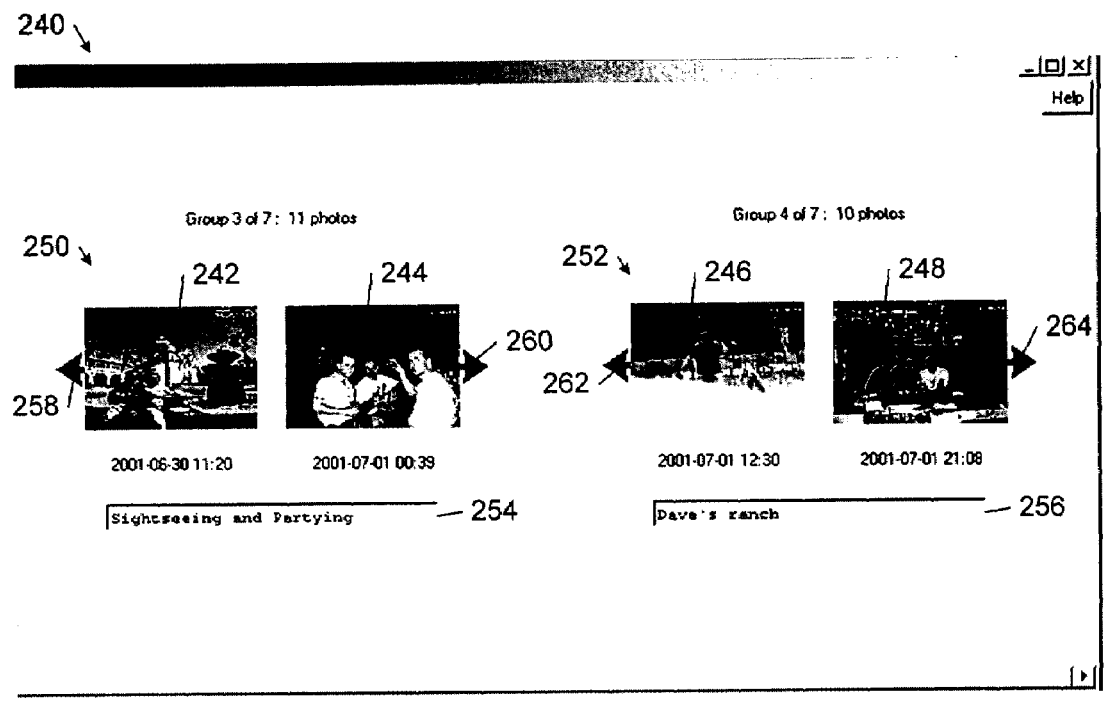
FIG. 9 is a diagrammatic screen shot of an embodiment of a user interface for browsing and editing a collection of segmented objects.

FIG. 9 shows an embodiment of a user interface 240 that allows a user to browse and organize a sequence of objects (digital photograph media objects in the example illustrated in FIG. 9) obtained from a collection that has been segmented into clusters. Each of the clusters includes multiple objects arranged in a respective sequence in accordance with context-related meta data associated with the objects. In this embodiment, layout engine 164 (FIG. 2) selects for each object cluster at least two constituent objects representative of beginning and ending instances in the corresponding object sequence. For example, in the illustrated implementation, layout engine 164 selects as representative objects the first and last objects 242, 244 and 246, 248 of a pair of neighboring clusters 250 and 252, respectively. In other implementations, layout engine 164 selects a predetermined number of objects near each of the beginning and end of each cluster. User interface 240 graphically presents the selected representative objects 242-248. The representative objects of any given cluster are presented closer to each other than to the representative objects of other clusters.

In addition to presenting the representative objects of each cluster, user interface 240 presents context-related information for each of the representative objects. For example, in the illustrated implementation, user interface displays the generation time (year-month-day hour:minute) of each of the representative objects 242-248. User interface 240 also identifies the cluster or group (e.g., "Group 3 of 7" for cluster 250) and the number of objects in each cluster (e.g., "11 photos" for cluster 250). User interface 240 provides a text box 254, 256 under each set of representative objects 242-248 customized name for each cluster (e.g., "Sightseeing and Partying" for cluster 250 and "Dave's ranch" for cluster 252).

The layout engine 164 is configured to merge objects of one cluster into another cluster in response to user input. For example, a user may drag and drop representative object 244 of cluster 250 into cluster 252. In response, layout engine 164 merges object 244 into cluster 252. Layout engine 164 selects a new representative object at the end of the sequence for cluster 250 and substitutes object 244 for the representative object 246 at the beginning of cluster 252. A user also may merge an entire cluster into another cluster by selecting one of the arrow icons 258, 260, 262, 164, which directs layout engine 164 to merge the cluster associated with the selected arrow icon into the neighboring cluster toward which the arrow icon is pointing. For example, a user may merge cluster 250 into cluster 252 by selecting arrow icon 260. Layout engine 164 updates the representative objects and object names after each customization.

Figure 10:
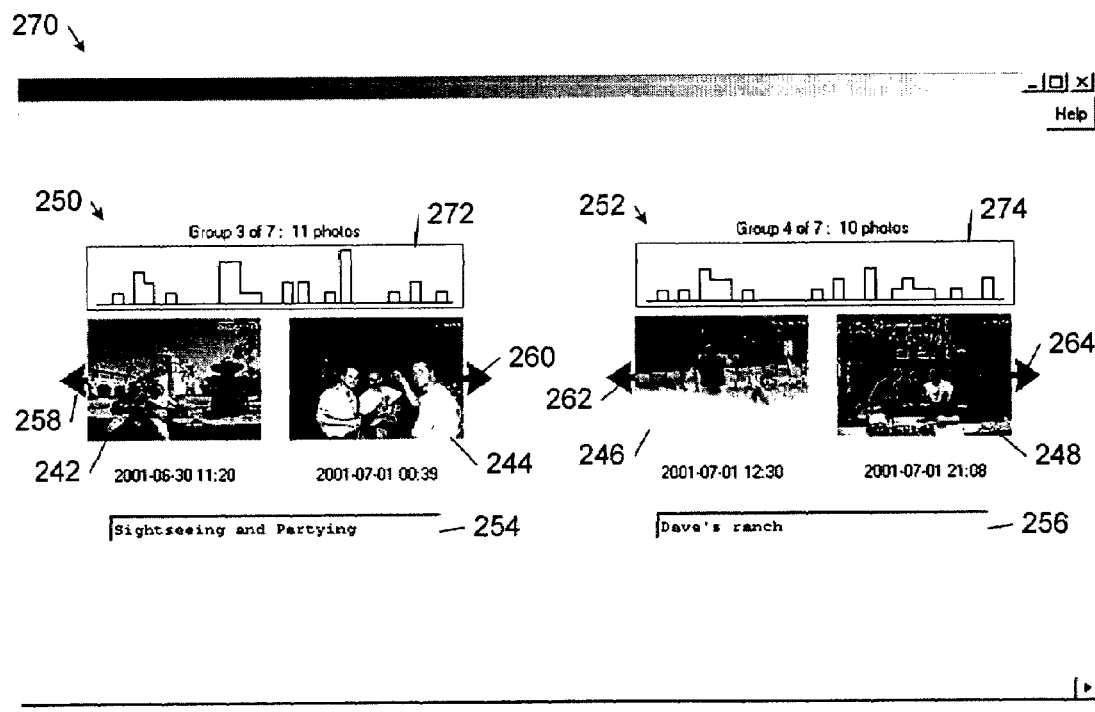
FIG. 10 is a diagrammatic screen shot of an embodiment of a user interface for browsing and editing a collection of segmented objects.

Referring to FIG. 10, in some embodiments, in addition to the information presented and the functionality provided by user interface 240, a user interface 270 displays histograms 272, 274 representative of the distribution of objects in the clusters 250, 252. Each histogram 272, 274 presents the number of object instances plotted along an axis corresponding to a scaled representation of the context-related extent (e.g., generation time in the example illustrated in FIG. 10) that is spanned by the corresponding cluster 250, 252. A user may direct layout engine 164 to split a given cluster 250, 252 into two groups by selecting a point in the corresponding histogram 272, 274 between the two groups of objects that are to be split. This allows a user to customize the clustering of objects based on the distribution of objects in each cluster.

In the embodiments described in connection with FIGS. 9 and 10, the segmented objects are digital photographs that are represented by corresponding thumbnail images. Objects of other types may be represented in other suitable ways. For example, a video media object may be represented by a single thumbnail image of a video keyframe or by a storyboard containing a set of video keyframes.

Figure 11:
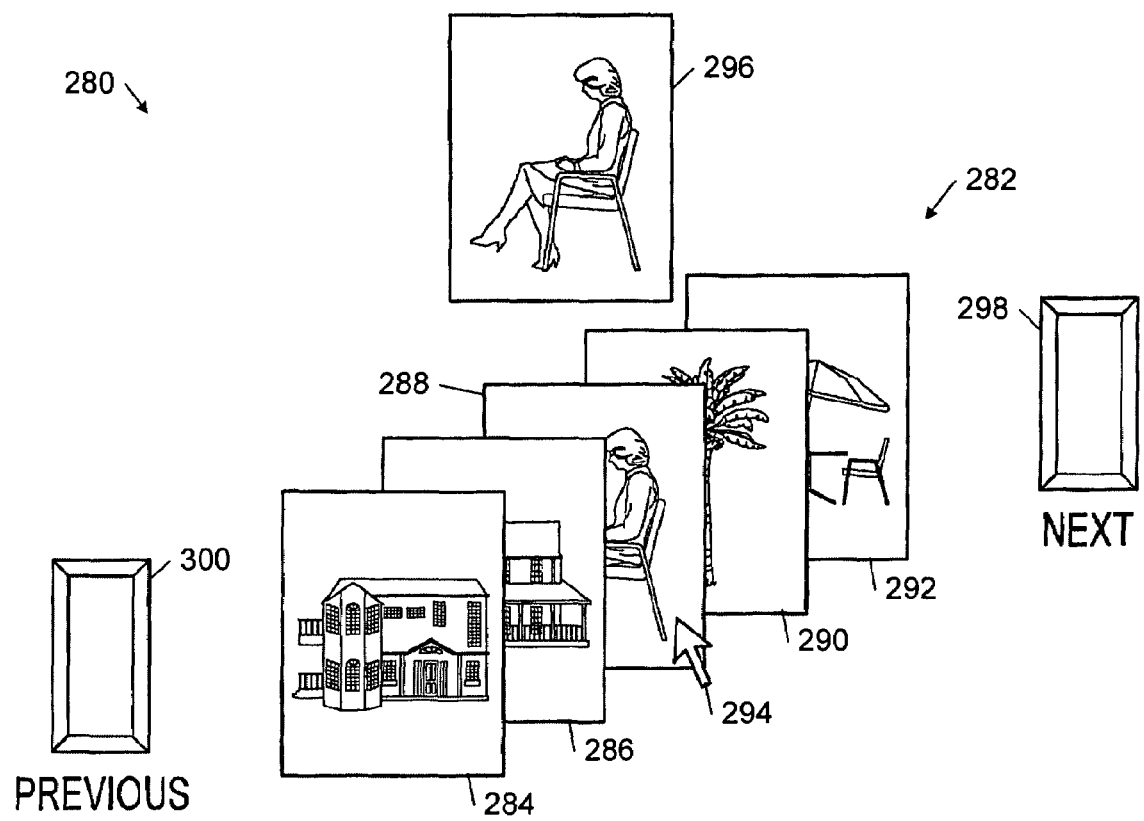
FIG. 11 is a diagrammatic screen shot of an embodiment of a user interface for cursor position browsing a collection of objects.

Referring to FIG. 11, in some embodiments, a user may browse objects within a cluster through a user interface 280 that graphically presents an "active cardstack" 282. User interface 280 may be accessed, for example, by double-clicking an object of a cluster or by selecting a "browse" icon associated with a cluster. In the illustrated example, cardstack 282 has five images 284, 286, 288, 290, 292. The images 284-292 extend diagonally and provide a perception of rearward images being partially covered by forward images so that only the foremost image 284 is shown in its entirety. Each of the images 284-292 represents display information (e.g., a representative thumbnail image) of an object in the corresponding cluster.

Since the active cardstack 282 is arranged such that each image 284-292 is at least partially exposed, a display icon, such as a cursor 294, may be moved into perceived contact with any one of the images. The images 284-292 may be described as first-level images. However, when the cursor is brought into contact with one of the images, a second-level image 196 is formed. Thus, the cardstack 282 is a dynamic stack that is manipulated merely by movement of the cursor 294 over the stack 282. In some implementations, it is not necessary to "click" the device that manipulates the cursor (e.g., a mouse) or to register a keyboard keystroke. In the example illustrated in FIG. 11, cursor 294 is shown as being positioned over image 288. In response, second-level image 296 is generated in a position offset from the original position. In this implementation, the first-level image 288 is preserved and the second-level image 296 is shown in its entirety. In another implementation, the second-level image is partially obscured by the corresponding first-level image 288.

If the cursor 294 is moved across the images 284-292 along a path in which the cursor 294 is sequentially aligned with the images 284-292, a corresponding sequence of second-level images will be presented to a viewer. In this manner, lo the content of each of the images 284-292 can be reviewed without requiring a repetitive point-and-click process.

The number of images within the original cardstack 280 may be set automatically or may be selected by the user. If the number of images 284-292 is less than the total number of images in a cluster, some embodiments allow continued browsing without requiring any user input beyond the positioning of the cursor 294. For example, if the cursor 294 is located immediately to the right of the cardstack 282, as viewed in FIG. 11, a successive subset of images in the cluster is introduced as a second active cardstack. For the purpose of reducing the likelihood that a new cardstack will be introduced unintentionally, a threshold activation time for the cursor may be required before the cardstack is changed. In the illustrated embodiment, stack-to-stack incrementing and decrementing icons 298, 300 are presented to the right and left of the cardstack 282, respectively. By positioning the cursor 294 over the incrementing icon 298, cardstack 282 is replaced with a successive cardstack. For example, if there are sevety-five digital images within the cluster currently being browsed, the cluster may be displayed sequentially in stacks of, for example, five images, if the cursor is left in position along the incrementing icon 68. Each image in a stack may be displayed as a second-level image before the stack is changed. The decrementing icon 300 operates in the reverse manner. In some implementations, the controlling computer program is configured to allow instant incrementing or decrementing by clicking the computer mouse when the cursor 294 resides on the appropriate icon 298, 300.

In some embodiments, in addition to displaying second-level image 296, positioning the cursor 294 over the exposed region of the first-level image 288 triggers the display of file information that identifies, for example, the storage location and the size of the image 288, and other pertinent information. For example, if the images 284-292 represent web pages, the file information may be the URLs of the images.

Additional details regarding the structure and operation of the embodiments of FIG. 11 may be obtained from U.S. Patent Application Publication No. 2002/0140746, which is incorporated herein by reference.

Figures 12A, 12B:
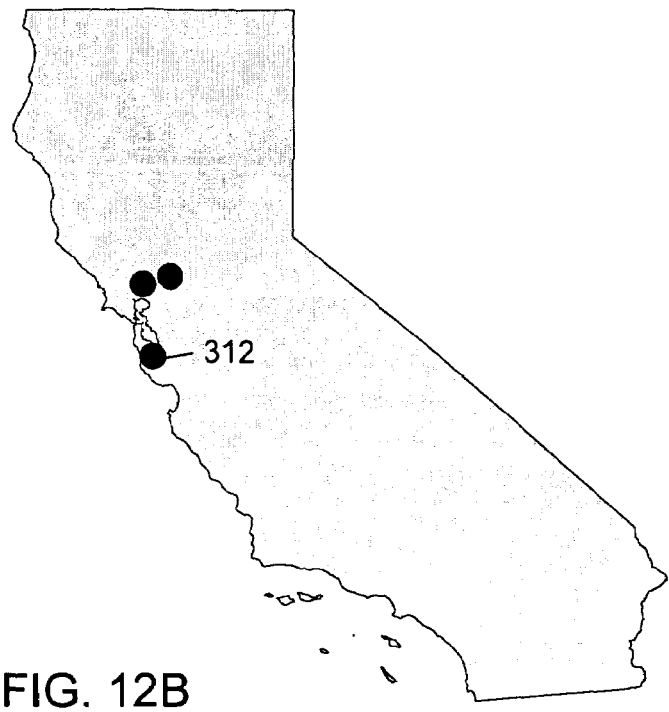
FIG. 12A is a diagrammatic screen shot of an embodiment of a user interface for browsing a collection of media objects organized in accordance with time-related meta data.
FIG. 12B is a diagrammatic screen shot of an embodiment of a user interface for browsing a collection of media objects organized in accordance with location-related meta data.

Referring to FIGS. 12A and 12B, in some embodiments, a user may browse objects in a collection through graphical user interfaces formatted in accordance with the context-related information used to organize and segment the objects in the collection. For example, in the case of objects segmented based on time-related context information, a user may browse the objects with a user interface presenting links 310 arranged in a calendar format, as shown in FIG. 12A. The links 310 may be links to clusters or individual objects in the collection, or they may be links to more detailed calendar views (e.g., a day view) showing a reduced set of the clusters or objects shown in the corresponding higher level view. Similarly, in the case of objects segmented based on location-related context information, a user may browse the objects with a user interface presenting links 312 arranged in a map format, as shown in FIG. 12B. In the case of objects organized in accordance with geographic location context information, the map format may correspond to a geographic map, as shown in FIG. 12A. Alternatively, in the case of objects organized in accordance with logical location context information, the map may correspond to a logical or network map. The links 312 may be links to clusters or individual objects in the collection or they may be links to more detailed map views (e.g., a county or city view) showing a reduced set of the clusters or objects shown in the corresponding higher level view.

VI. Management of Exemplary Object Types

The object management embodiments described above may be used to manage any type of objects, including media objects and business process objects.

A. Media Object Management

Figure 13:
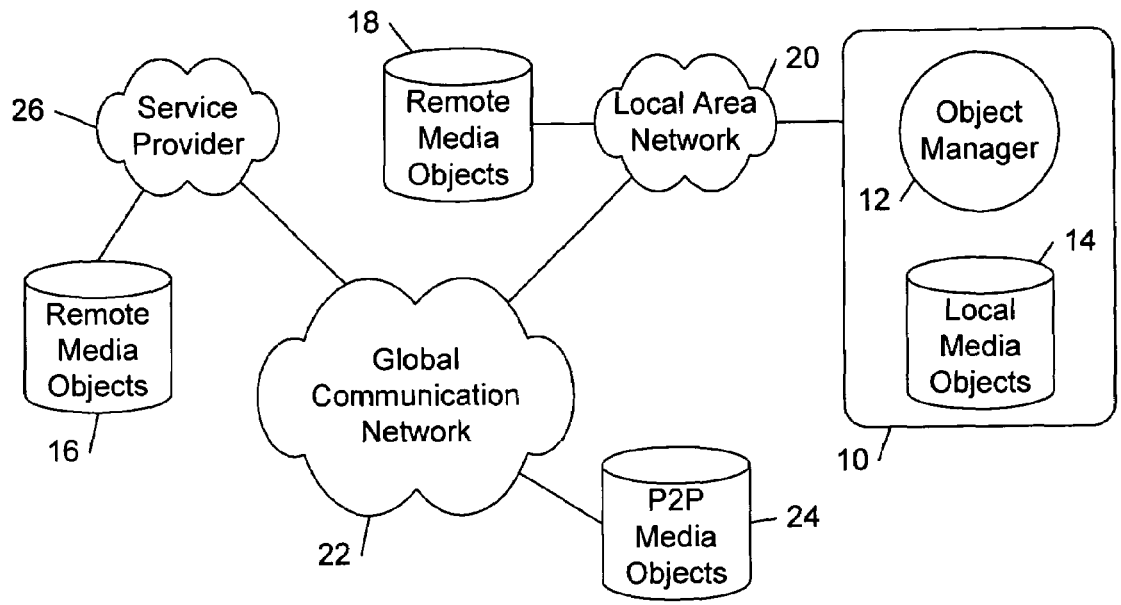
FIG. 13 is a diagrammatic view of a object management node coupled directly to a set of local media files and coupled indirectly to multiple sets of remote media files over a local area network and a global network infrastructure.

FIG. 13 shows an embodiment of a object management node 10 that includes a object manager 12 that is configured to organize all forms of digital content in a selected collection of media objects. As used herein, the term "media object" refers broadly to any form of digital content, including text, audio, graphics, animated graphics and full-motion video. This content is implemented as one or more data structures that may be packaged and presented individually or in some combination in a wide variety of different forms, including documents, annotations, presentations, music, still photographs, commercial videos, home movies, and meta data describing one or more associated digital content files. As used herein, the term "data structure" refers broadly to the physical layout (or format) in which data is organized and stored. The media objects may be stored physically in a local database 14 of object management node 10 or in one or more remote databases 16, 18 that may be accessed over a local area network 20 and a global communication network 22, respectively. Some media objects also may be stored in a remote database 24 that is accessible over a peer-to-peer (P2P) network connection. In some embodiments, digital content may be compressed using a compression format that is selected based upon digital content type (e.g., an MP3 or a WMA compression format for audio works, and an MPEG or a motion JPEG compression format for audio/video works). The digital content may be formatted in accordance with a user-specified transmission format. For example, the requested digital content may be transmitted to the user in a format that is suitable for rendering by a computer, a wireless device, or a voice device. In addition, the requested digital content may be transmitted to the user as a complete file or in a streaming file format.

A user may interact with object manager 12 locally, at object management node 10, or remotely, over local area network 20 or global communication network 22. Transmissions between object manager 12, the user, and the content providers may be conducted in accordance with one or more conventional secure transmission protocols. For example, each digital content transmission may involve packaging the digital content and any associated meta-data into an encrypted transfer file that may be transmitted securely from one entity to another.

Global communication network 22 may include a number of different computing platforms and transport facilities, including a voice network, a wireless network, and a computer network. Object requests may be transmitted, and object replies may be presented in a number of different media formats, such as voice, internet, e-mail and wireless formats. In this way, users may access the services provided by object management node 10 and the remote objects 16 provided by service provider 26 and peer-to-peer remote database 24 using any one of a wide variety of different communication devices.

Object manager 12 may provide access to a selected digital content collection in a variety of different ways. In one embodiment, a user may organize and browse through a personal collection of a diverse variety of media objects. In another embodiment, object manager 12 may operate an internet web site that may be accessed by a conventional web browser application program executing on a user's computer system. In an alternative embodiment, a traditional brick-and-mortar retail establishment (e.g., a bookstore or a music store) may contain one or more kiosks (or content preview stations). The kiosks may be configured to communicate with object manager 12 (e.g., over a network communication channel) to provide user access to digital content that may be rendered at the kiosk or transferred to a user's portable media device for later playback. A kiosk may include a computer system with a graphical user interface that enables users to navigate through and organize a collection of digital content that is stored locally at the retail establishment or that is stored remotely and is retrievable over a network communication channel. A kiosk also may include a cable port that a user may connect to a portable media device for downloading selected digital content.

In embodiments in which a user interacts remotely with object manager 12, the user may store the media objects and the cluster data structures that are generated during a session in a portable storage device or on a selected network storage location that is accessible over a network connection.

B. Buisness Process Object Management

Figure 14:
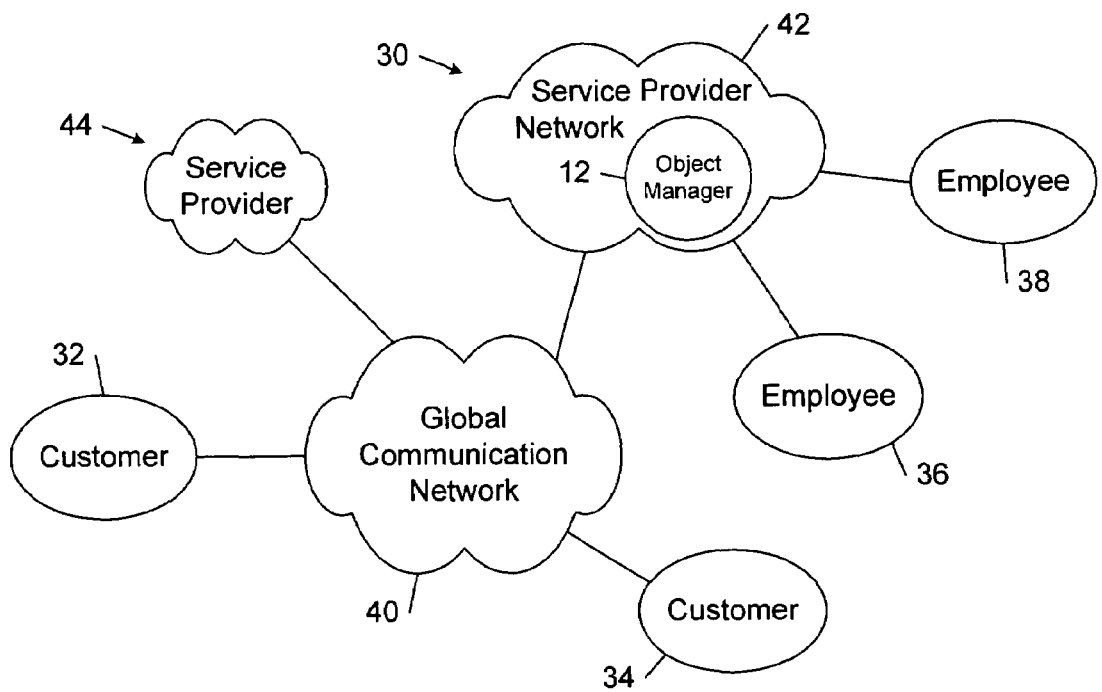
FIG. 14 is diagrammatic view of an e-business driven infrastructure that includes service providers, customers and employees that are interconnected by a global communication network.

Referring to FIG. 14, a service provider 30 may deliver one or more services to customers 32, 34 and employees 36, 38 over a global communication network 40 and a service provider network 42. In order to deliver such services, service provider 30 executes processes and functions that may require the use of several resources and the invocation of other services, possibly offered by one or more remote service providers 44. For example, to deliver an e-procurement service, service provider 30 may invoke (web or traditional) services provided by suppliers, warehouses, and shipment companies, as well as services provided by internal (human or automated) resources, such as administrative employees, ERP (Enterprise Resource Planning) systems, Java beans, implementation of WSDL (Web Service Description Language) services, and printers. The process instances that are executed by service provider 30 are referred to herein as "business events" that are documented in the form of business process objects, each of which is associated with respective context-related meta data (e.g., time meta data, location meta data, or both time and location meta data). Object manager 12 may be used to organize and browse a collection of business process objects, as described in detail below.

Figure 15:
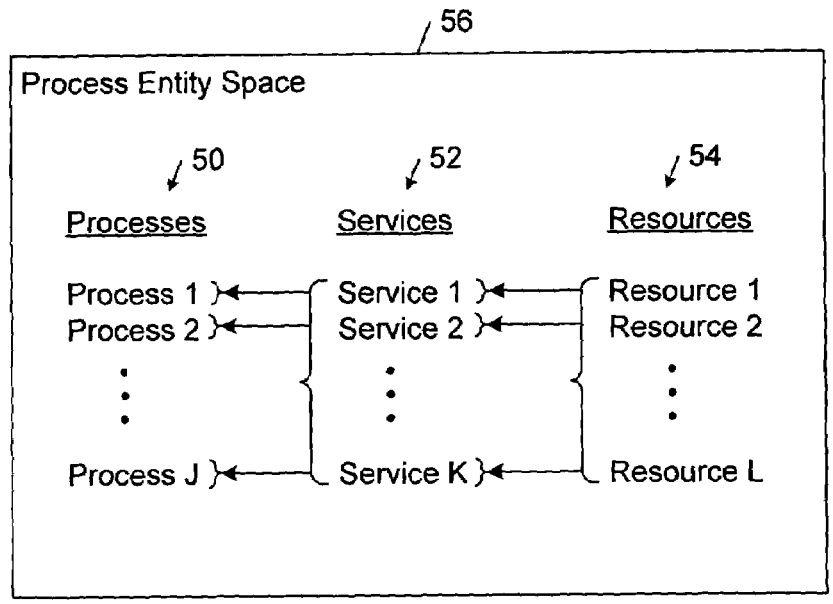
FIG. 15 is a diagrammatic view of a process entity space.

Referring to FIG. 15, the services provided by service provider 30 may be built from a collection of business process entities, including processes 50, services 52, and resources 54. In particular, any given service may be defined by a directed graph of business processes 50. Each process 50 is operable to invoke one or more services 52 for carrying out a specified activity. Each service 52 specifies the way in which a particular activity should be performed. Each service 52 is operable to invoke one or more resources 54, each of which performs an activity in accordance with the service definition. Each resource 54 may be invoked by one more services 52, and each service 52 may be invoked by one or more processes 50. In the context of process entity space 56, each business process 50 may be visualized along multiple dimensions and multiple levels of granularity based upon the mappings between the business process and its associated services and resources.

Figure 16:
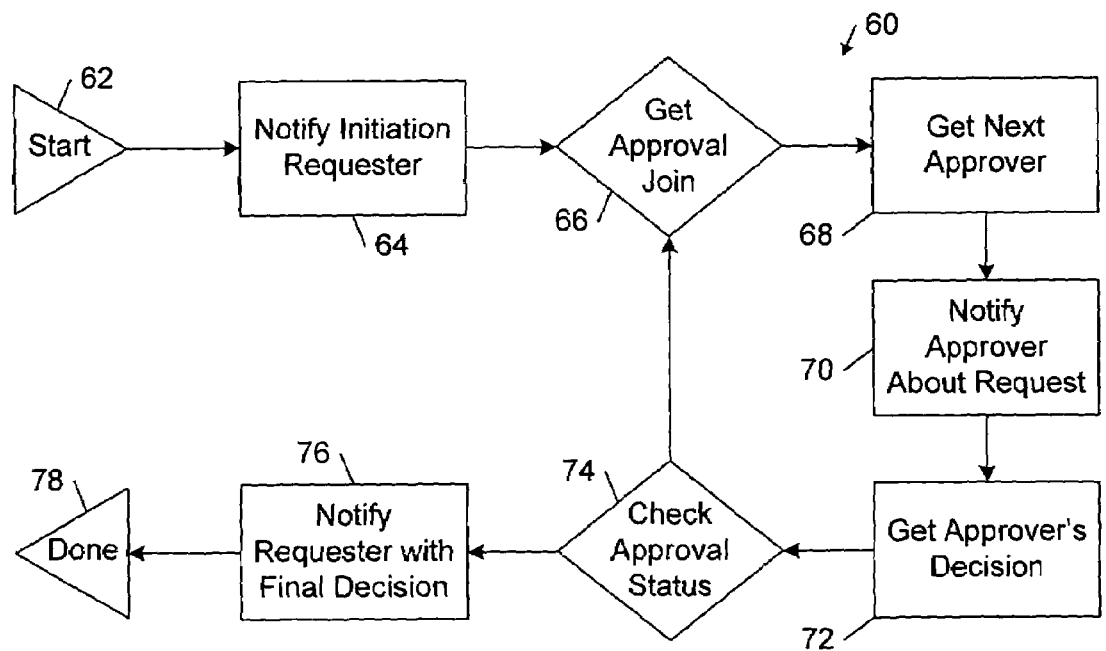
FIG. 16 is a workflow diagram of an expense approval process.

As shown in FIG. 16, a business process may be modeled as a directed graph 60 having different types of nodes, including for example work nodes, route nodes, start nodes, and completion nodes. A work node represents the invocation of a service (or activity). Each work node is associated with a service description that defines the logic for selecting a resource or resource group to be invoked for executing the work. The service definition also identifies the data items to be passed to the resource upon invocation (e.g., execution parameters or input data) and to be received from the resource upon completion of the work (e.g., status values, output data). Several work nodes may be associated to the same service definition. Route nodes are decision points that control the execution flow among nodes based on a routing rule. A start node denotes the entry point to the process, and completion nodes denote termination points. A process definition may be instantiated several times and multiple instances may be concurrently active. Activity executions may access and modify data included in a case packet. Each process instance has a local copy of the case packet.

In the embodiment illustrated in FIG. 16, graph 60 models an expense approval process. The process begins in start node 62 with the requester. The case packet data (i.e., the data variables declared for this process) for the expense approval process may include, for example, the identity of the requester, the expense amount, the reasons, and the names of the individuals that should evaluate the request. Once the process is initiated, the requester is notified in work node 64. Work node 64 may invoke another service for notification. For example, notification may be performed by the service send_email. Upon invocation of the send_email service, an email is sent to the requester with notification that the process has begun. The process loops among the list of individuals until either all of the approvers approve the expense request or one of the approvers rejects the expense request (nodes 66-68). (Join 66 is an OR join that executes whenever any input executes.) The final decision is reported to the requester in work node 76 before the process terminates at completion node 78.

Work nodes are associated to services. At run time, when a work node is executed, the associated service (that characterizes the function to be performed) is dispatched to internal or external resources (e.g., an employee, a computer system within the domain of service provider 30, or an application operated by another business entity). The appropriate resources may be selected by a resource broker (also called resource executive) based upon business logic that may be included as part of the process definition, work node definition, or system configuration. A service typically is identified by a name (e.g., approve_request) and by a set of data items (e.g., the name of the requester, the purpose of the request, and the amount of money required to fulfill the request). The work may be dispatched in several different ways. For example, the work item (i.e., a service instance along with specific values of the parameters) may be inserted into a resource work list, in which case resources log into the system to retrieve work items. In other approaches, a process automation system sends work items to the selected resources, in which case resources are presented with a set of work items to be performed when the resources access their work lists. A resource may select one or more items from the work list, execute the selected items, and return the result to the process automation system.

Figure 17:
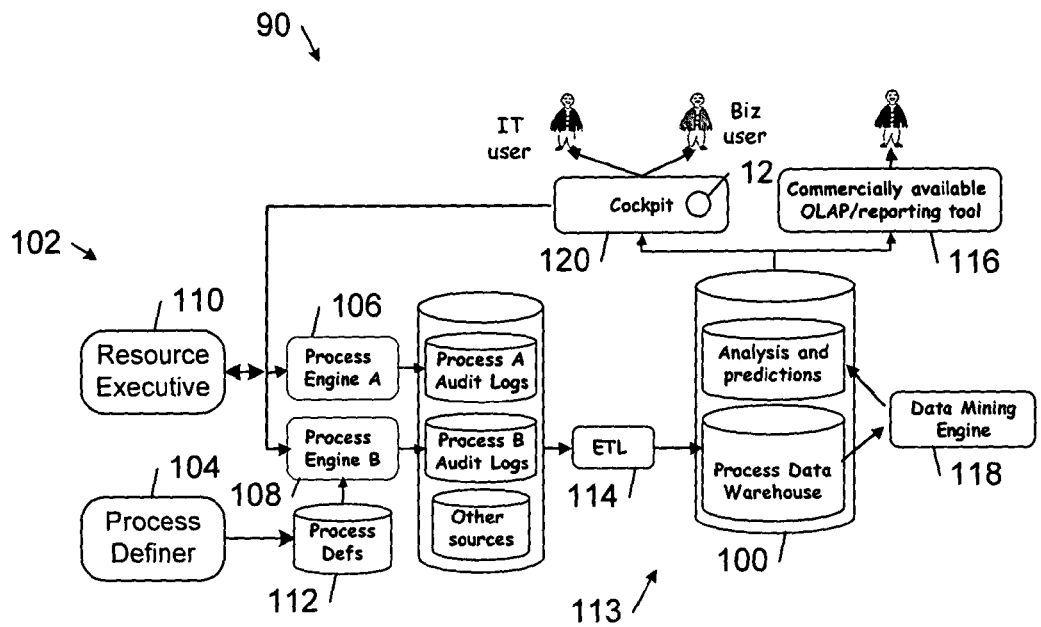
FIG. 17 is a block diagram of internal components of a business management system.

Referring to FIG. 17, a business process management system 90 includes a business process automation tool 102 (e.g., an HP Process Manager, available from Hewlett-Packard Company of Palo Alto, Calif., U.S.A.) comprising a process definer 104, one or more process engines 106, 108, and a resource executive 110. Process definer 104 defines processes as a collection of nodes, services, and input and output parameters. The process definitions are stored in a database 112. Database 112 may contain, for example, a process definition that includes a start node, a completion node, work nodes, route nodes, and services to be invoked by the process. A process definition also includes an indication of the way in which the nodes are interconnected. Process engines 106, 108 execute processes by scheduling nodes to be activated. When a work node is activated, process engines 106, 108 retrieve the associated service definition and resource assignment rule. The resource assignment rule is communicated to the resource executive 110, which identifies one or more resources (e.g., a specific vendor, employee, or piece of equipment) that should execute the service. During execution of processes, process engines 106, 108 step through the process definitions to determine which activities should be performed next, and use the resource executive 110 to assign a resource (or resources) to the activities. Process engines 106, 108 send activity requests and any data needed to perform the activities to the resources identified by the resource executive 110. When the activity is completed, the process engines 106, 108 refer to the process definitions to determine the next nodes to be activated.

Business process management system 90 also includes a business operation intelligence engine 113 that is implemented as a set of tools that support the monitoring, analysis, and management of business operations. Referring again to FIG. 17, in the illustrated embodiment, business operation intelligence engine 113 includes an extract, transfer, and load (ETL) application 114, a data warehouse 100, a data mining engine 118, and a business process cockpit 120.

The ETL application 114 collects data from the audit logs and loads the data into business process data warehouse 100. ETL application 114 performs conventional warehousing functions, such as data cleaning, and formats the process execution data into a predefined record format. Additional details relating to the structure and operation of the business process data warehouse 100 and ETL application 114 may be obtained from U.S. patent application Ser. No. 09/860,230, filed May 17, 2001, by Fabio Casati et al. and entitled "Method of Identifying and Analyzing Business Processes from Workflow Audit Files," and Angela Bonifati et al., "Warehousing Workflow Data: Challenges and Opportunities," Proceedings of VLDB'01, Rome, Italy (September 2001), each of which is incorporated herein by reference. Data in the business process data warehouse 100 may be accessed directly with a commercial reporting tool 116 (e.g., Crystal Reports, available from Crystal Decisions, Inc. of Palo Alto, Calif., U.S.A., and Oracle Discoverer available from Oracle Corporation of Redwood Shores, Calif.). In addition, a data mining tool 118 may apply data mining techniques on top of business process data warehouse 100 to assist analysts in identifying the causes of high and low-quality executions and deriving prediction models that may be used at run-time to predict process execution quality for running processes.

The business process cockpit (BPC) 120 enables a user to investigate a business process by supporting real-time monitoring, analysis, management, and optimization of business processes running on top of the business process automation tool 102.

Figure 18:
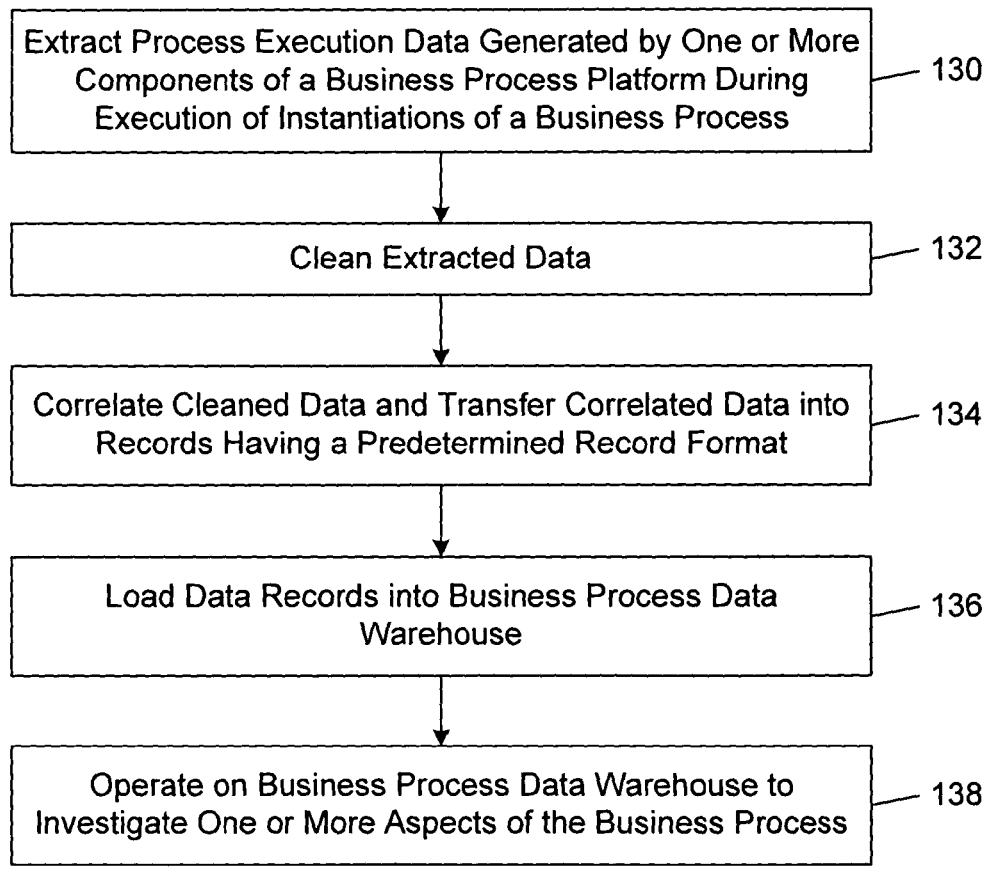
FIG. 18 is a flow diagram of a method of investigating a business process.

Referring to FIG. 18, in one embodiment, a user may operate the business operation intelligence engine 113 to investigate a business process as follows. Initially, the business operation intelligence engine 113 extracts process execution data that is generated by one or more components of the business process platform during execution of instantiations of the business process (step 130). The extract, transfer and load application 114 cleans the extracted data, for example, in accordance with a conventional data warehouse data cleaning process (step 132). The cleaned data is correlated across multiple business process platform components for each business process instantiation, and the correlated data is transferred into records having a predetermined record format (step 134). The data records (or business process objects), which may include context-related meta data, including generation (or creation) time meta data and generation (or creation) location meta data, are loaded into business process data warehouse 100 (step 136). Next, business operation intelligence engine 113 operates on business process data warehouse 100 to investigate one or more aspects of the business process (step 138).

As explained above, business process cockpit 120 incorporates object manager 12 and provides a graphical user interface through which users may browse and organize business process objects, including objects containing data relating to processes, services, resources, and other process-related entities. Additional details relating to the structure and functionalities of the business process intelligence engine 113 and business process cockpit 120 may be obtained from U.S. patent application Ser. No. 10/200,306, filed on Jul. 22, 2002, and entitled "SEMANTICALLY INVESTIGATING BUSINESS PROCESSES," which is incorporated herein by reference.

VII. Conclusion

The systems and methods described herein are not limited to any particular hardware or software configuration, but rather they may be implemented in any computing or processing environment, including in digital electronic circuitry or in computer hardware, firmware, or software.

Other embodiments are within the scope of the claims.

What is claimed is:

1. A method of organizing, a collection of objects arranged in a sequence ordered in accordance with a selected dimension of context-related metadata respectively associated with the objects, comprising operating a processor to perform operations comprising:

classifying the objects in the sequence to generate a series of object clusters, wherein the classifying comprises sequentially processing each of the objects as a respective candidate for segmentation into a respective current one of the object clusters in the series and, for each of the candidate objects, determining a candidate object interval separating the candidate object from an adjacent object in the sequence already segmented into the current object cluster, the candidate object interval being measured in the selected dimension of the context-related metadata, comparing the candidate object interval to a weighted measure of cluster extent for the current object cluster, the measure of cluster extent corresponding to a current distance spanned by all the objects in the current object cluster measured in the selected dimension of the context-related metadata, and comparing the candidate object interval to a weighted measure of object density for the current object cluster, the measure of object density corresponding to a measure of distribution of distances separating adjacent ones of the objects in the current object cluster measured in the selected dimension of the context-related metadata.

2. The method of claim 1, wherein the measure of cluster extent for each current object cluster corresponds to a temporal distance spanned by recorded generation times associated with all objects in the current object cluster.

3. The method of claim 1, wherein the measure of cluster extent for each current object cluster corresponds to a spatial distance spanned by recorded generation locations associated with all objects in the current object cluster.

4. The method of claim 1, wherein the measure of object density for each current object cluster corresponds to an average temporal distance separating adjacent objects in the current object cluster.

5. The method of claim 1, wherein the measure of object density for each current object cluster corresponds to an average spatial distance separating adjacent objects in the current object cluster.

6. The method of claim 1, wherein the classifying comprises merging consecutive ones of the candidate objects into a current one of the object clusters until the candidate object interval determined for a current one of the candidate objects exceeds the weighted measure of cluster extent for the current cluster, at which point a successive one of the object clusters in the series is initiated with the current candidate object.

7. The method of claim 1, wherein the classifying comprises merging consecutive ones of the candidate objects into a current one of the object clusters until the candidate object interval determined for a current one of the candidate objects exceeds the weighted measure of object density for the current object cluster, at which point a successive one of the object clusters in the series is initiated with the current candidate object.

8. The method of claim 1, wherein the processing comprises determining the weighted measures of cluster extent by applying to the measures of cluster extent respective weights that decrease with increasing sizes of the respective object clusters.

9. The method of claim 1, wherein the processing comprises determining the weighted measures of cluster extent by applying to the measures of cluster extent respective weights that decrease with increasing sizes of the respective object clusters.

10. The method of claim 1, further comprising customizing at least one of the weights applied to the measures of cluster extent based on an analysis of objects in the corresponding object cluster.

11. The method of claim 10, wherein the customizing comprises scaling at least one of the weights applied to the measures of cluster extent based on a fractal dimension estimate of recorded time generation meta data associated with the objects in the collection.

12. The method of claim 1, further comprising customizing at least one of the weights applied to the measures of cluster object density based on an analysis of objects in the corresponding object cluster.

13. The method of claim 12, wherein the customizing comprises scaling at least one of the weights applied to the measures of cluster extent based on a fractal dimension estimate of recorded time generation meta data associated with the objects in the collection.

14. The method of claim 1, wherein the processing further comprises comparing the object density of a candidate object cluster consisting of the current object cluster and the candidate object with the weighted measure of object density for the current object cluster.

15. The method of claim 14, wherein the measure of object density for each current object cluster corresponds to an average temporal distance separating adjacent objects in the current object cluster.

16. The method of claim 14, wherein the measure of object density for each current object cluster corresponds to an average spatial distance separating adjacent objects in the current object cluster.

17. The method of claim 14, wherein the measure of object density for each object cluster corresponds to a moving average distance separating adjacent objects in the current object cluster.

18. The method of claim 14, wherein the processing comprises determining the weighted measures of cluster extent by applying to the measures of cluster extent respective weights that decrease with increasing sizes of the respective object clusters.

19. The method of claim 1, wherein the processing comprises processing each of the candidate objects sequentially beginning at a first end of the object sequence.

20. The method of claim 19, wherein the processing further comprises processing each of the candidate objects sequentially beginning at a second end of the object sequence opposite the first end.

21. The method of claim 1, wherein the sequence to be segmented includes objects of the following types: text, audio, graphics, still images, video and business events.

22. A system of organizing a collection of objects arranged in a sequence ordered in accordance with a selected dimension of context-related metadata respectively associated with the objects, comprising:
- a computer-readable medium storing computer-readable instructions; and
- a data processing unit coupled to the computer-readable medium operable to execute the instructions, and based at least in part on the execution of the instructions operable to perform operations comprising
- classifying the objects in the sequence to generate a series of object clusters, wherein each of the objects is sequentially processed as a respective candidate for segmentation into a respective current one of the object clusters in the series and, for each of the candidate objects, perform operations comprising
  - determining a candidate object interval separating the candidate object from an adjacent object in the sequence already segmented into the current object cluster, the candidate object interval being measured in the selected dimension of the context-related metadata,
  - compare the candidate object interval to a weighted measure of cluster extent for the current object cluster, the measure of cluster extent corresponding to a current distance spanned by all the objects in the current object cluster measured in the selected dimension of the context-related metadata, and
  - comparing the candidate object interval to a weighted measure of cluster object density for the current object cluster, the measure of object density corresponding to a measure of distribution of distances separating adjacent ones of the objects in the current object cluster measured in the selected dimension of the context-related metadata.

23. A method of organizing a collection of objects, comprising operating a processor to perform operations comprising:
- segmenting objects from the collection into clusters;
- extracting context-related meta data corresponding to object generation locations associated with the objects, wherein the extracted context-related meta data are parsable into multiple levels of a geographical name hierarchy generated for browsing; and
- assigning location names to clusters, wherein each cluster is assigned a respective location name based on the associated extracted context-related meta data corresponding to a level of the geographical name hierarchy selected to distinguish segmented clusters from one another.

24. The method of claim 23, wherein the context-related meta data corresponds to recorded information relating to country, city, and state of object generation.

25. The method of claim 23, wherein the context-related meta data corresponds to both object generation times and object generation locations.

26. The method of claim 23, further comprising automatically naming objects in a given cluster based on the location name assigned to the given cluster.

27. The method of claim 26, wherein the objects in the given cluster are named automatically in accordance with a chronological ordering of the objects in the given cluster.

28. The method of claim 26, further comprising storing objects in the given cluster in a tree structure organized by cluster and labeled in accordance with the assigned names.

29. A system of organizing a collection of objects, comprising:
- a computer-readable medium storing computer-readable instructions; and
- a data processing unit coupled to the computer-readable medium, operable to execute the instructions, and based at least in part on the execution of the instructions operable to perform operations comprising
- segmenting objects from the collection into clusters; and
- extracting context-related meta data corresponding to object generation locations associated with the objects, wherein the extracted context-related meta data are parsable into multiple levels of a geographical name hierarch generated for browsing; and
- assigning location names to each cluster, wherein each cluster is assigned a respective location name based on the associated extracted context-related meta data corresponding to a level of the geographical name hierarchy selected to distinguish segmented clusters from one another.

30. A method of organizing a collection of objects, comprising operating a processor to perform operations comprising:
- accessing a sequence of objects segmented into object clusters each including multiple constituent objects arranged in a respective sequence in accordance with context-related meta data associated with the objects;
- for each object cluster selecting at least two constituent objects representative of beginning and ending instances in the corresponding constituent object sequence in the object cluster, wherein the at least two constituent object comprising first and last constituent objects in the corresponding constituent object sequence of the object cluster; and
- in a user interface, graphically presenting the selected constituent objects of each object cluster without graphically presenting representations of unselected ones of the constituent objects of the object clusters.

31. The method of claim 30, further comprising graphically presenting a selected one of the object clusters as a stack of partially overlapping images representative of multiple objects in the selected object cluster.

32. The method of claim 31, further comprising revealing an increased portion of a given one of the representative images in the stack in response to detection of a user-controlled display icon positioned over the given representative image.

33. The method of claim 30, wherein the presenting comprises presenting the selected constituent objects with the spacing between adjacent ones of the selected constituent objects in the same object cluster smaller than the spacing between adjacent ones of the selected constituent objects in different object clusters.

34. The method of claim 30, further comprising merging objects of one object cluster into an adjacent object cluster in response to user input.

35. The method of claim 34, wherein objects of one object cluster are merged into an adjacent object cluster in response to dragging and dropping of the objects to be merged.

36. The method of claim 34, wherein the objects of the one object cluster are merged into the adjacent object cluster in response to user selection of an icon for merging the object clusters.

37. The method of claim 30, further comprising presenting a graphical representation of distributions of objects in the object clusters.

38. The method of claim 37, wherein a object distribution for a given object cluster is presented as object instances plotted along an axis corresponding to a scaled representation of the context-related extent spanned by the given object cluster.

39. The method of claim 37, further comprising splitting a given object cluster in response to user selection of a point in the representation of the object distribution presented for the given object cluster.

40. The method of claim 37, further comprising automatically splitting a given object cluster into two or more object clusters in response to user input.

41. The method of claim 40, wherein the given object cluster is automatically split into a user-selected number of sub-clusters.

42. The method of claim 40, wherein the given object cluster is automatically split based on relative sizes of intervals between successive objects in the given object cluster.

43. The method of claim 30, wherein the context-related meta data corresponds to object generation times.

44. The method of claim 30, wherein the context-related meta data corresponds to object generation locations.

45. The method of claim 30, wherein the segmented sequence includes objects of the following types: text, audio, graphics, still images, video, and business events.

46. The method of claim 30, further comprising graphically presenting at least one link to an object of an object cluster arranged in a sequence in accordance with time-related meta data in a calendar format.

47. The method of claim 30, further comprising graphically presenting at least one link to an object of an object cluster arranged in a sequence in accordance with location-related meta data in a map format.

48. A system of organizing a collection of objects, comprising:
   a computer-readable medium storing computer-readable instructions; and
   a data processing unit coupled to the computer-readable medium, operable to execute the instructions, and based at least in part on the execution of the instructions operable to perform operations comprising
      accessing a sequence of objects from the collection segmented into clusters each including multiple objects arranged in a respective sequence in accordance with context-related meta data associated with the objects;
      for each object cluster selecting at least two constituent objects representative of beginning and ending instances in the corresponding constituent object sequence in the object cluster, wherein the at least two constituent objects comprising first and last constituent objects in the corresponding constituent object sequence of the object cluster; and
      in a user interface, graphically presenting the selected constituent objects of each object cluster on a screen without graphically presenting representations of unselected ones of the constituent objects of the object clusters, wherein the selected constituent objects are presented with the spacing between adjacent ones of the selected constituent objects in the same object cluster smaller than the spacing between adjacent ones of the selected constituent objects in different object clusters.

* * * * *

UNITED STATES PATENT AND TRADEMARK OFFICE
CERTIFICATE OF CORRECTION

PATENT NO. : 7,747,625 B2
APPLICATION NO. : 10/631369
DATED : June 29, 2010
INVENTOR(S) : Ullas Gargi et al.

Page 1 of 1

It is certified that error appears in the above-identified patent and that said Letters Patent is hereby corrected as shown below:

In column 19, line 13, in Claim 1, delete "organizing," and insert -- organizing --, therefor.

In column 21, line 8, in Claim 22, delete "medium" and insert -- medium, --, therefor.

In column 22, lines 11-12, in Claim 29, delete "hierarch" and insert -- hierarchy --, therefor.

Signed and Sealed this
Tenth Day of April, 2012

David J. Kappos
*Director of the United States Patent and Trademark Office*